(12) United States Patent
Thut

(10) Patent No.: US 8,246,715 B2
(45) Date of Patent: Aug. 21, 2012

(54) ADJUSTABLE VORTEXER APPARATUS

(76) Inventor: Bruno H. Thut, Chagrin Falls, OH (US)

( * ) Notice: Subject to any disclaimer, the term of this patent is extended or adjusted under 35 U.S.C. 154(b) by 88 days.

(21) Appl. No.: 12/787,556

(22) Filed: May 26, 2010

(65) Prior Publication Data

US 2011/0290076 A1     Dec. 1, 2011

(51) Int. Cl.
*C22B 9/00* (2006.01)
(52) U.S. Cl. .......................................... 75/375; 75/708
(58) Field of Classification Search ................. 75/375, 75/708
See application file for complete search history.

(56) References Cited

U.S. PATENT DOCUMENTS

| | | |
|---|---|---|
| 3,272,619 A | 9/1966 | Sweeney et al. |
| 4,060,408 A | 11/1977 | Kuhn |
| 4,149,704 A | 4/1979 | de Savigny |
| 4,286,985 A | 9/1981 | van Linden et al. |
| 4,466,827 A | 8/1984 | Zeug |
| 4,747,583 A | 5/1988 | Gordon et al. |
| 5,385,338 A | 1/1995 | Sato et al. |
| 5,435,527 A | 7/1995 | Margaria |
| 5,810,907 A | 9/1998 | Okada et al. |
| 5,984,999 A | 11/1999 | Areaux |
| 6,036,745 A | 3/2000 | Gilbert et al. |
| 6,074,455 A | 6/2000 | van Linden et al. |
| 6,217,823 B1 * | 4/2001 | Vild et al. ................ 266/44 |
| 7,314,348 B2 * | 1/2008 | Thut ....................... 415/200 |
| 7,476,357 B2 | 1/2009 | Thut |
| 7,497,988 B2 | 3/2009 | Thut |
| 7,507,365 B2 | 3/2009 | Thut |
| 7,687,017 B2 | 3/2010 | Thut |

FOREIGN PATENT DOCUMENTS

JP     57160569 A  * 10/1982

OTHER PUBLICATIONS

Taira et al. JP 57-160569 A, published Oct. 1982. English translation.*

* cited by examiner

*Primary Examiner* — George Wyszomierski
*Assistant Examiner* — Tima M McGuthry Banks
(74) *Attorney, Agent, or Firm* — Pearne & Gordon LLP

(57) ABSTRACT

A method of adjusting a vortex of molten metal comprises providing a scrap charging vessel. The scrap charging vessel includes a vortex control plate having an outlet orifice that can be positioned at a bottom of the vessel so that the outlet orifice is in fluid communication with an outlet passageway of the vessel. A vortex level is estimated or observed. A size of the outlet orifice of the vortex control plate is selected that can produce a desired level of a vortex in the vessel that is the same as or different than the estimated or observed vortex level. The vortex control plate of the selected outlet orifice size is positioned in the vessel. Molten metal is moved into an inlet opening of the vessel and forms the vortex at the desired level in the vessel.

9 Claims, 6 Drawing Sheets

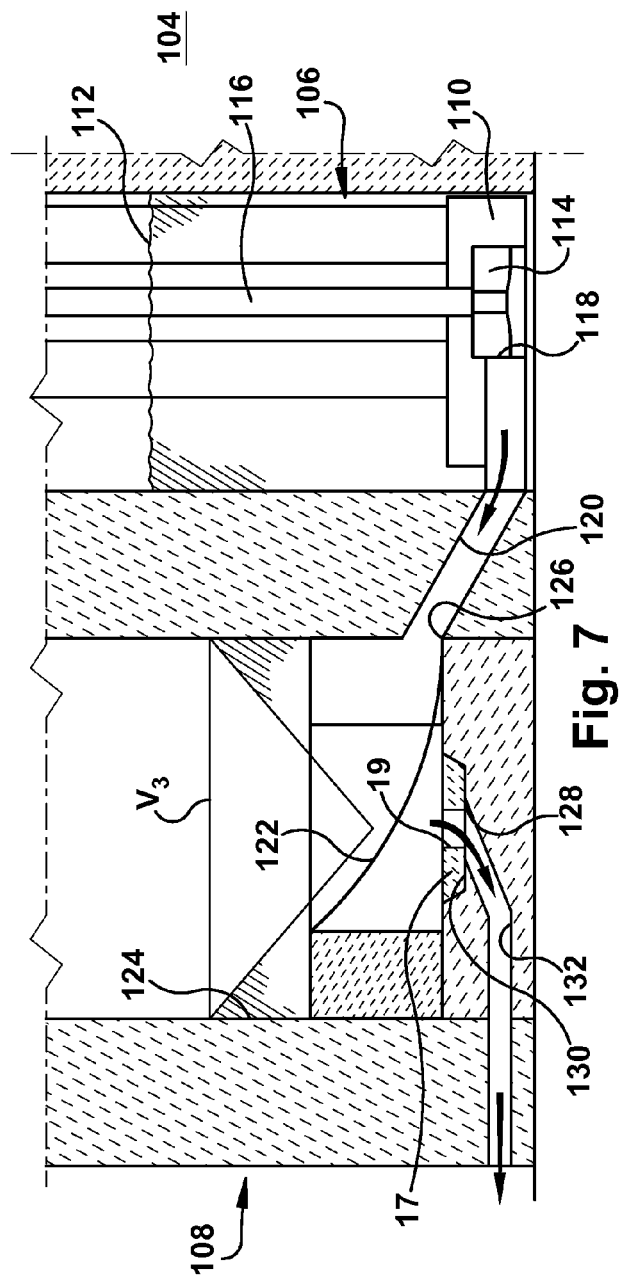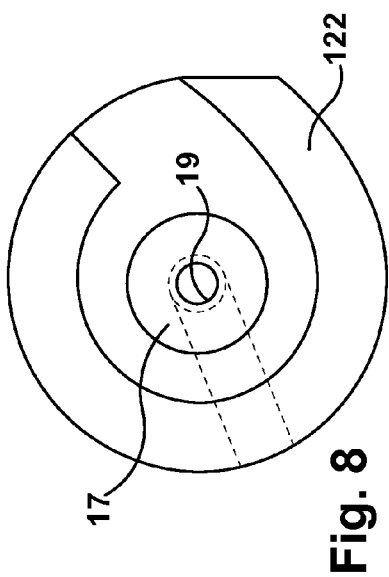

ADJUSTABLE VORTEXER APPARATUS

BACKGROUND OF THE INVENTION

Various devices have been used to submerge metal scrap in molten metal. A scrap submerging device can be used in a melting system for converting scrap metal into metal ingots. Molten metal contained in a hearth is circulated by a pump contained in a pump well. In one design, molten metal is drawn from the hearth by the pump and circulated from the pump well to a scrap charging well, to a dross well and back to the hearth. Scrap metal such as aluminum can scrap is added to molten metal in the charge well. It is important to facilitate rapid melting of the scrap, but this is difficult to do because the scrap has a low density causing it to float.

Some devices have mechanical equipment located above a charge well that physically submerges the scrap in the molten metal. Other devices utilize a rotor in the scrap charging vessel to pull the scrap into the molten metal. Yet other devices utilize a pump located outside of the charge well that pumps molten metal into a vessel contained by the charge well without the need for mechanical equipment in the charge well itself.

U.S. Pat. No. 6,217,823 discloses using a ramp to achieve a vortex with an initially upward flow of molten metal along a ramp adjacent outer walls inside the scrap charging vessel and then downwardly toward an outlet of the vessel.

One of the disadvantages of current vortexer apparatuses in which molten metal is pumped into the charge well from a pump without any movable parts in the charge well, is that the only way to adjust the level of the vortex is to adjust the speed at which the pump rotates the impeller. This variation of the vortex can be limited by the pumping capacity of the pumps, being either too large or too small to achieve the intended vortex height. In addition, adjusting the height of the vortex by increasing the speed of rotation of the impeller in the base of a pump is disadvantageous because it requires more energy to operate the pump when a higher vortex is desired.

DISCLOSURE OF THE INVENTION

The present invention features an adjustable vortexer apparatus and, in particular, a scrap submergence apparatus used to submerge and melt scrap metal in molten metal (e.g., aluminum can scrap in molten aluminum). Molten metal contained in a hearth is caused to circulate, for example, by a pump. In one furnace design, molten metal is drawn from the hearth by the pump and caused to circulate from a pump well to a scrap charging well, to a dross well and back to the hearth. Scrap metal is added to molten metal in the charge well. It is important to facilitate rapid melting of the scrap, but this is difficult to achieve because the scrap has a low density causing it to float. By adjusting the level of the vortex in a vortex vessel of the apparatus, the size of the pump and/or its flow rate can be changed as desired to adjust the desired vortex height and thus, to influence scrap melting capacity.

A method of adjusting a vortex of molten metal, comprises providing a vessel comprising an exterior surface, an interior surface for containing molten metal and a mouth for receiving material at an upper end portion of the interior surface. An outlet passageway extends downwardly from the interior surface. A vortex control plate has an outlet orifice that can be positioned at a bottom of the vessel so that the outlet orifice is in fluid communication with the outlet passageway. There is an inlet opening in the vessel. A vortex level is estimated or observed. A size of the outlet orifice of the vortex control plate is selected that can produce a desired level of a vortex in the vessel that is the same as or different than the estimated or observed vortex level. For example, a vortex height in the vessel can be observed from operation of previous pumps and then the desired vortex level can be raised from this level. Alternatively, the vortex height can be estimated by using computer modeling and then the vortex level can have the same height as the estimated vortex level. The step of positioning the vortex control plate of the selected outlet orifice size is carried out. Molten metal is moved into the vessel inlet opening (as by the operation of a pump) and the vortex is formed at the desired level in the vessel.

Regarding specific features of the method, at least first and second vortex control plates can be provided. A step of operating the pump while using the first vortex control plate is carried out. The level of the vortex in the vessel using the first vortex control plate is observed. The second vortex control plate is selected to produce the desired level of the vortex that is different than the observed level of the vortex.

Another specific feature provides a vessel seating surface located at the bottom of the vessel around the outlet passageway. The step of positioning the vortex control plate in contact with the vessel seating surface is carried out. The vessel seating surface can include a flat bottom surface leading to the outlet passageway and an inclined side wall extending upwardly from the bottom surface. The vortex control plate can have a frustonical shape, and is seated on the vessel seating surface. No cement need be applied between the vessel seating surface and the seated vortex control plate.

In another aspect of the method, first and second vortex control plates can be provided, wherein the second vortex control plate has an outlet orifice that is smaller than the outlet orifice of the first vortex control plate. The positioning step and operating the pump are carried out such that the following relationships occurs: $V2 \geqq V1$ when $F2 \leqq F1$, where V2 and V1 are the levels of the vortex in the vessel, and F2 and F1 are the flow rates through the vessel inlet opening, when the second vortex control plate and the first vortex control plate are used, respectively. In another aspect, a first large pump with a large pumping capacity is operated. The first vortex V1 is formed in the vessel while using the first vortex control plate. Then the large pump is replaced with a second pump having a smaller pumping capacity. The second pump is operated and the second vortex V2 is created in the vessel while using the second vortex control plate.

In another aspect, the vessel includes a circulation passageway (e.g., along which molten metal is pumped through the block of the vessel and circulates through the furnace). The molten metal is moved from the pump along the circulation passageway. In one design the impeller of the pump includes an upper impeller member and a lower impeller member. The base of the pump includes upper and lower impeller chambers stacked over one another, wherein the upper impeller member and the lower impeller member are rotatably disposed in the upper impeller chamber and the lower impeller chamber, respectively. A transfer passageway extends from either the upper or lower impeller chamber and is in communication with the inlet opening of the vessel and a discharge passageway extends from either the upper or lower impeller chambers and is in communication with the circulation passageway. Molten metal is moved out of the base and into the inlet opening of the vessel and into the circulation passageway. The outlet passageway from the vessel and the circulation passageway can be isolated from each other or interconnected together.

More than two stacked impeller chambers and respective outlets can be used if desired, for example, the pump shown in FIG. 1 might include a third stacked impeller chamber and a third impeller member rotatably disposed in it, the outlet of the third impeller chamber leading to a second riser for transferring the molten metal to another location. It will be understood that one or more additional impeller chambers may be disposed above or below the upper impeller chamber and lower impeller chamber described above, and the pump would include additional impellers or impeller members rotatably disposed in each additional impeller chamber, along with suitable pump inlets and/or impeller chamber outlets.

The interior surface of the vessel is generally circular in cross-section and the vessel inlet opening can extend generally tangentially to the interior surface.

In another type of scrap charging vessel as described in the U.S. Pat. No. 6,217,823 modified to use the vortex control plate described in this disclosure, the vortex is created by moving the molten metal from the vessel inlet opening up a ramp located near a side wall of the interior surface of the vessel, the molten metal then descending down into the interior of the vessel. The vessel of the '823 patent can be modified so as to carry out the positioning of the vortex control plate of the selected outlet orifice at the bottom of the vessel; the vortex is created by pumping molten metal into the vessel up the ramp and is present at the desired vortex level due to the vortex control plate; and then the molten metal is removed through the selected outlet orifice and through the outlet passageway.

When the interior surface of the vessel has a circular cross-section and the vessel inlet opening extends generally tangentially to the interior surface, the method can include the step of flowing the molten metal from the vessel inlet opening generally tangentially into the vessel.

One, two or more impellers or impeller members are rotated in the pump base. Two or more separate impellers or impeller members of a single impeller could be rotated on a shaft, one in each impeller chamber. The impeller chambers are coaxial. A web opening about the same diameter as the impeller can be located in a wall or web disposed between the impeller chambers transverse to the rotational impeller axis and can be nearly the same size as the impeller diameter and aligned with upper and lower circular inlet openings in the base. Each impeller or impeller member includes an inlet near an end portion and an outlet near a side of the impeller. In particular, each impeller or impeller member can include an end plate near the web separating the impeller chambers. A baffle impeller having a central imperforate baffle could be used (as disclosed in U.S. Pat. No. 7,497,988, which is incorporated herein by reference in its entirety). The baffle is positioned near the web between the first and second impeller chambers effective to substantially separate the molten metal in the two chambers. The impeller with baffle plate includes a first inlet near one end portion, a first outlet near a side of the impeller, a second inlet near the other end portion and a second outlet near a side of the impeller, the first and second outlets being spaced apart by the baffle in a direction of the rotational impeller axis.

Rotation of two or more impellers or single impeller with two or more impeller members, on the end of the shaft draws molten metal into each of the impeller chambers, into the impeller inlets, out through the impeller outlets, and to the respective outlets of the base. Thus, the pump causes molten metal simultaneously to flow into the charge vessel, creating the vortex in the vessel, and to flow into the circulation passageway of the charge vessel. It will be appreciated that the invention contemplates regulating the multi-impeller chamber pump or selecting a single, dual or multi-impeller chamber pump, so as to direct molten metal only out of a single outlet, such as only to the circulation passageway when no scrap is being charged into the charge vessel, and to two or more transfer locations or transfer and discharge locations, including blended output, as disclosed in U.S. Pat. No. 7,507,365, which is incorporated herein by reference in its entirety.

More specifically, the multi-impeller chamber pump could be used as a discharge pump and/or transfer pump or other pump known in the art. The multi-impeller chamber pump of the present invention enables molten metal to be directed to two or more locations: for example, two discharge locations, one discharge and one transfer location, and two or three transfer and/or discharge/transfer locations (e.g., when the stacked impellers include three impeller chambers stacked on one another leading to three transfer conduits). In addition, the flow through each outlet passageway from each respective impeller chamber can be selectively controlled to select discharge from one or more or all of the base outlet passageways. For example, the impeller with multiple impeller members could be operated to circulate molten metal along the circulation passageway at the same or at a different time as when molten metal is sent into the vessel forming the vortex, and in addition can send molten metal to one or more transfer locations remote from the bath while one or both of circulation and forming of the vortex for scrap charging occur. Another embodiment of the inventive pump with dual impeller chambers directs molten metal from both impeller chambers to a common discharge passageway in the base of the pump and then to the exterior of the pump (e.g., top and bottom feed pump with dual intake, non-baffled impeller).

The pump used in this invention may include all of the features described herein and further variations. For example, the pump could include one, two or more impellers or impeller members on the shaft. One preferred impeller is the baffle impeller with dual intake, described herein which may employ vanes or passages. The vanes or passages can be modified and impellers can be used, as disclosed in U.S. Pat. No. 7,314,348, entitled "IMPELLER FOR MOLTEN METAL PUMP WITH REDUCED CLOGGING," which is incorporated herein by reference in its entirety. Other impellers that may be suitable for use in the present invention include other conventional vaned or barrel type of impellers. However, a suitable seal between the impeller chambers, or tight clearance between the impeller and the web, may be used depending on the function of the pump. One pump in accordance with the present invention features both impeller chambers as volutes (i.e., a dual volute pump) and the use of the baffle impeller from the U.S. Pat. No. 7,497,988 .

Gas may be introduced near or into one or more of the impeller chambers in accordance with the invention, as disclosed in U.S. Pat. No. 7,476,357, entitled "Gas Mixing and Dispersement in Pumps for Pumping Molten Metal," which is incorporated herein by reference in its entirety. Conduits might also extend from outside the vessel down to the vessel interior, and/or the vessel inlet, outlet or circulation passageways for feeding gas, liquids and/or solids into the molten metal. Various chemically reactive and inert gases may be introduced into the molten metal including chlorine-containing gas, nitrogen and argon for purposes known to those skilled in the art.

The molten metal and any unmelted scrap travel downwardly through the outlet passageway of the charge well and then to the next destination in the melting process, such as to a dross well or hearth. The hearth is typically an enclosed chamber heated by burners containing most of the volume of molten metal and from which molten metal or solid metal is fed and molten metal is pumped. The furnace may have many variations as known to those skilled in the art. For example, a dross well may be located downstream of the charge well.

Alternatively, the dross well may be omitted. Dross may be skimmed from the molten metal in the enclosed main hearth and the charge well may communicate directly with the main hearth. Dross may be skimmed from the charge well instead of or in addition to the main hearth.

With regard to further variations of the invention, rather than a base outlet passageway that extends from the impeller chamber to an exterior surface of the base and is in fluid communication with a transfer riser that leads to near the charge well inlet passageway, the invention may include a single outlet passageway extending directly from the impeller chamber to near the charge well inlet passageway. This passageway may be in the form of a conduit leading directly from the impeller chamber. Alternatively, the pump base could include a block of material having a passageway formed therein extending from the impeller chamber to near the charge well inlet opening, instead of a riser extending between the base and charge well inlet passageway. In these cases the pump base is separate from the vessel for cleaning and repair.

One aspect of the invention includes a discharge passageway extending from the impeller chamber toward an exterior surface of the base, and a conduit plug in fluid communication with the discharge passageway having one end portion in contact with the base and another end portion in contact with and in fluid communication with the circulation passageway. A conduit plug may also be positioned in contact with the transfer conduit outlet and the vessel inlet opening. This avoids inefficiencies caused by backflow between the pump and vessel.

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents embodiments that should not be construed as necessary limitations of the broad invention as defined in the claims.

BRIEF DESCRIPTION OF THE DRAWINGS

FIG. 7 is a cross-sectional view of another type of vortexer apparatus described in this disclosure; and FIG. 8 is a top plan view of the vessel of FIG. 7.

DETAILED DESCRIPTION

Figure 5:
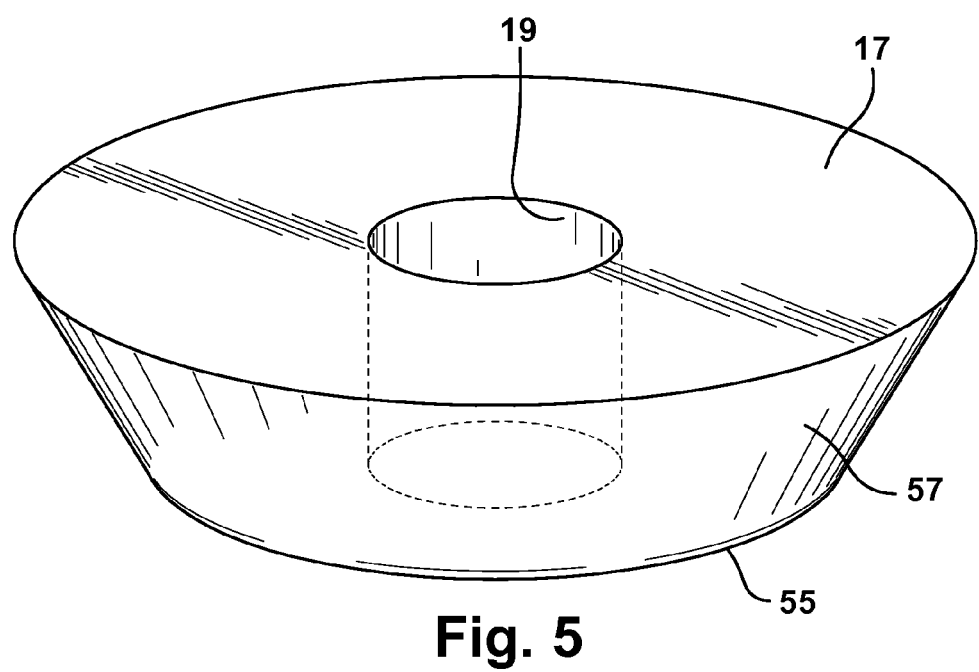
FIG. 5 is a perspective view of a vortexer control plate.

Referring to the drawings, the vortexer apparatus 10 includes a vortexer or charge vessel 12 formed from a block of refractory material and having a side wall 14, an outlet passageway 16 located near a lower portion of the vessel and an inlet passageway 18 in the side wall of the vessel located below the surface of molten metal contained in the vessel and above, or at the same level as, the outlet passageway. Molten metal M enters the vessel from the inlet passageway 18 at a location offset from a central axis of the vessel (as described in U.S. Pat. No. 7,497,988, which is incorporated herein by reference) and, in particular, at a location tangential to the interior surface 14a of the vessel (as described in the U.S. Pat. No. 7,497,988). The inlet passageway 18 extends from an exterior surface of the vessel near the pump to an interior surface of the vessel. Molten metal leaves the vessel through the outlet passageway 16 near the bottom of the vessel. A vortex control plate 17 is disposed at the bottom of the vessel and has a selectable outlet orifice 19 in fluid communication (e.g., in alignment) with the outlet passageway 16 of the vessel (FIG. 5). When positioned, the vortex control plate forces all flow of the molten metal through the outlet orifice 19 into the vessel outlet passageway 16. The outlet orifice can have a size that is different than a size of outlet orifice of another vortex control plate (for example, vortex control plates 17a and 17b shown in FIGS. 2 and 3 having outlet orifices 19a and 19b, producing vortexes V1 and V2, respectively, at the same flow rate though the inlet passageway 18 into the vessel, as discussed in more detail below). This use of a vortex control plate of selected outlet orifice size enables the level of the vortex in the vessel, and thus the scrap melting capacity, to be adjusted as desired.

In particular, the vessel has an interior surface 14a that contains molten metal in the vessel and an exterior surface 14b. The vessel interior is circular in cross-section. The vessel is disposed in a bath of molten metal and the exterior surface contacts the molten metal bath. The upper portion of the interior surface 14a forms a mouth 15 configured to receive metal scrap. The outlet passageway 16 extends downwardly from the interior surface 14a at the bottom of the vessel.

A pump 20 for pumping molten metal into the vessel includes a shaft 22 driven by a motor 24 at an upper end, an impeller 26 connected to the lower end of the shaft, a base 28 including an impeller chamber 30 in which the impeller is rotatable, an inlet in the base including upper and lower inlets 32a and 32b, respectively, an outlet 34 in the base and an outlet conduit or riser 36 extending from the base to a motor mount 27 and having an outlet near the inlet passageway 18 of the vessel. The motor is supported outside the molten metal by the motor mount 27 as known in the art. Support posts 21 extend between the base and motor mount for submerging the base in the molten metal. The support posts 21 and riser 36 can be removably fastened by clamps at their upper ends to the motor mount and cemented at their lower ends to the base. The passageway 37 in the riser extends to approximately the same vertical height as the vessel inlet opening and is completely submerged in molten metal.

Figure 2:
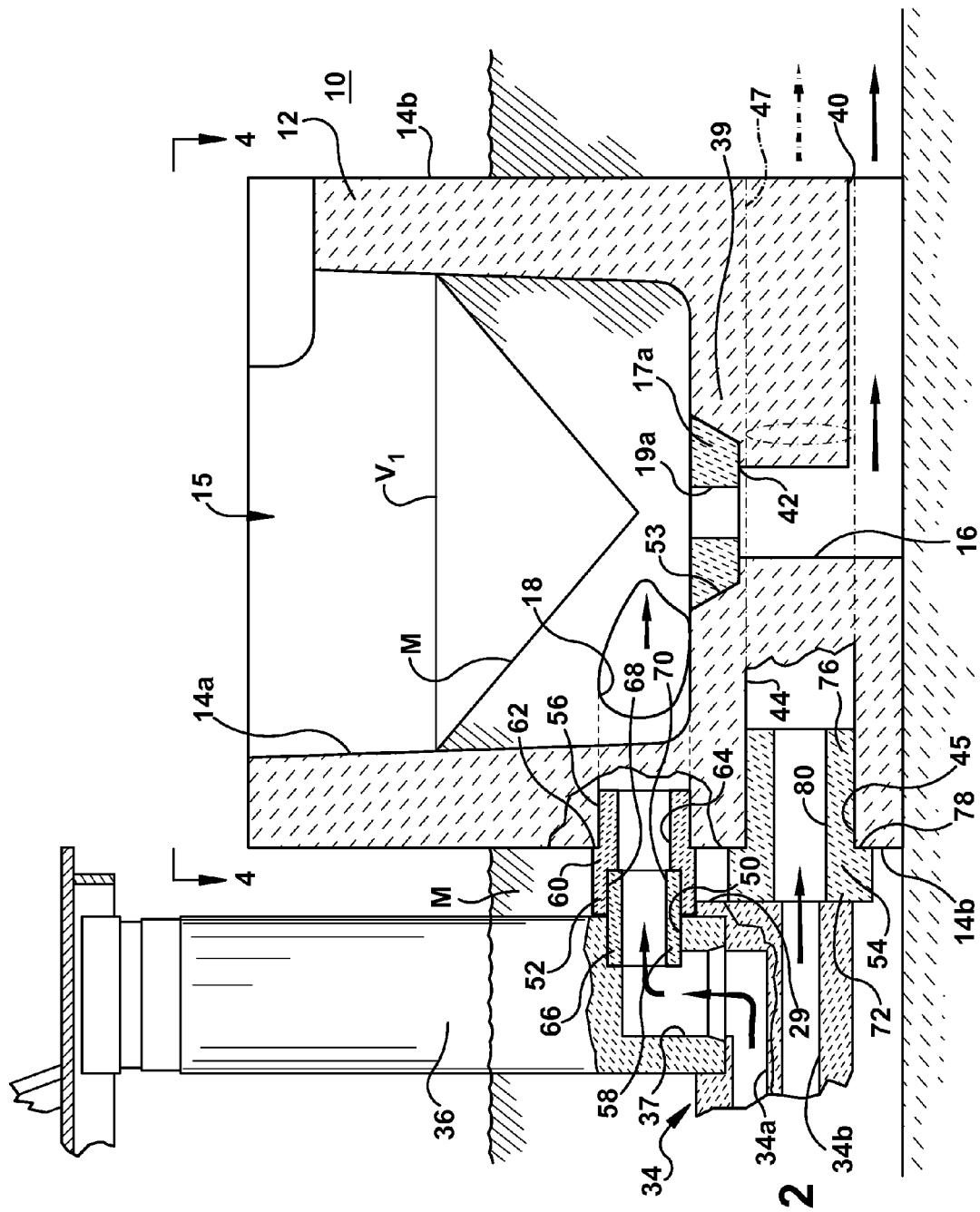
FIG. 2 is vertical cross-sectional view of the vortexer apparatus of FIG. 1.

Molten metal is drawn into the base of the pump by rotation of the impeller in the impeller chamber, leaves the base and travels through the riser. Molten metal leaves the pump having a positive pressure. As shown in FIG. 2, molten metal travels from the riser passageway 37 through the inlet passageway 18 into the charge vessel 12. The inlet passageway 18 is tangential to the interior of the vessel. The direction of flow of the molten metal from the riser into the vessel creates a vortex flow (V1, V2) of molten metal in the vessel. The molten metal in the vessel travels downwardly in the vortex toward the outlet passageway 16. The vortex flow of molten metal efficiently pulls scrap down into the charge well along the vortex flow path. Molten metal travels through the outlet passageway 16 of the vessel and then travels to the next destination (e.g., dross well or hearth).

The outlet passageway 16 permits the exit of molten metal from the bottom 39 of the vessel at outlet opening 40. At a location of intersection 42 of the outlet passageway with the interior surface 14a of the charge vessel (FIG. 2), the outlet passageway is concentric with the vessel wall near the bottom of the vessel.

Figure 1:
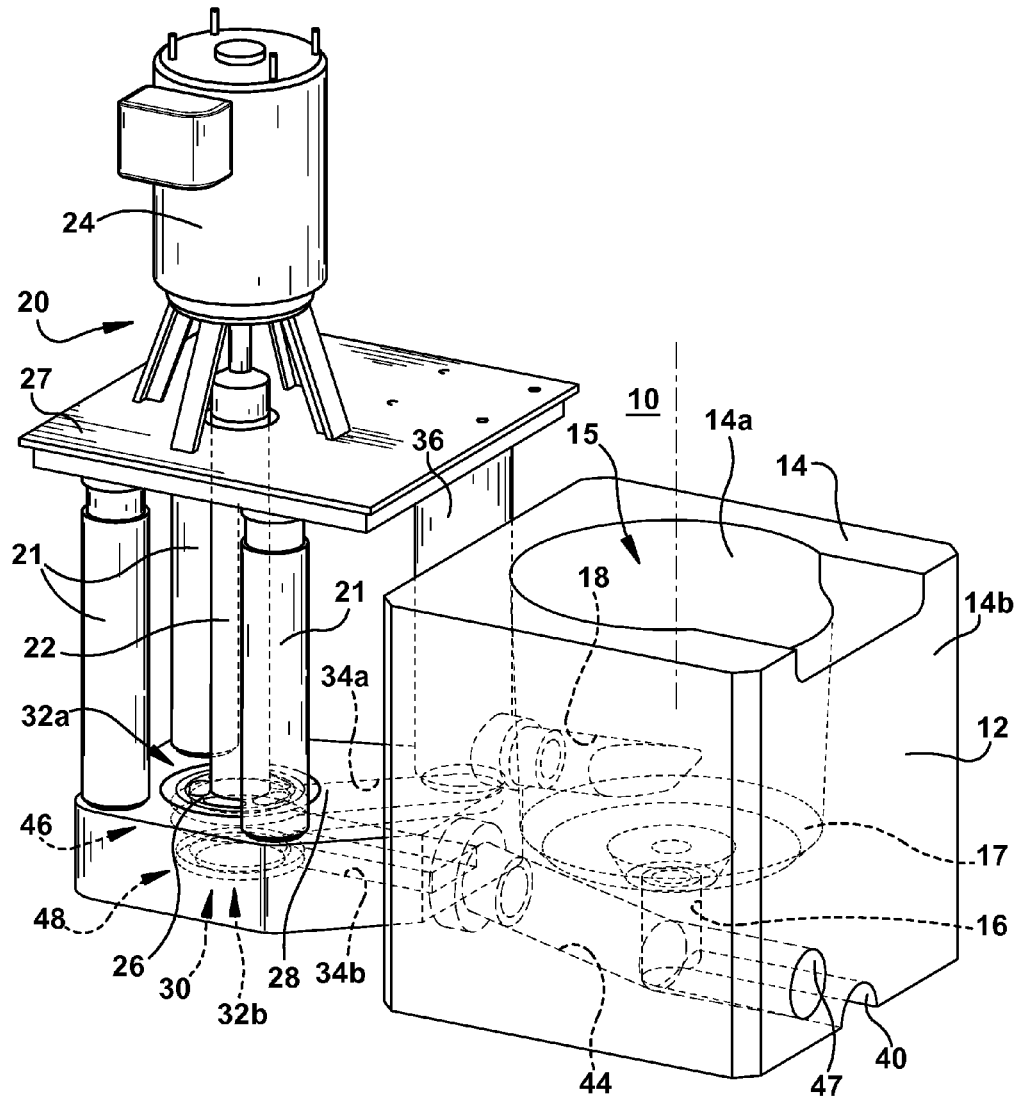
FIG. 1 is a perspective view of a vortexer apparatus described in this disclosure.

As shown in FIGS. 1 and 2 and discussed in the U.S. Pat. No. 7,497,988, the pump includes upper and lower impeller chambers 46, 48. In particular, the impeller chambers both include a wall that forms a volute. The term volute has its ordinary meaning and generally refers to a spiral shaped opening that improves pumping efficiency compared to rotating an impeller in the center of a generally cylindrical volume. Inlet 32a leads to upper impeller chamber 46 and outlet passage 34a leads from that impeller chamber. The riser passageway 37 extends from passage 34a toward the inlet passageway 18 of the vessel. The riser has an outlet opening 50 (FIG. 2) near or in contact with the vessel in alignment with the vessel inlet passageway 18. Inlet 32b leads to lower impeller chamber 48 and discharge passageway 34b leads from that impeller chamber toward an exterior surface of the base. The discharge passageway 34b extends near a circulation passageway 44. The circulation passageway has an inlet opening 45 at the exterior of the vessel at one location near the pump and an outlet opening 47 at another location. The base can include only an upper base inlet opening 32a and upper intake impeller, only a lower base inlet opening 32b and lower intake impeller or both upper and lower base inlet openings 32a, 32b and an impeller with dual (upper and lower) intake as disclosed in the U.S. Pat. Nos. 7,497,988 and 7,314,348 disclosed herein.

The base inlet opening may be obturated by an optional base inlet sleeve located around the shaft and having openings sized smaller than particles intended to be kept out of the base as known in the art. The base inlet opening leads to the impeller chamber and the base discharge passageway leads from the impeller chamber toward an exterior surface 29 of the base.

The invention may employ any of the vaned and barrel types of impellers described in U.S. Pat. No. 7,497,988, which is incorporated herein by reference in its entirety. The base is designed to accommodate these impellers. One or more impellers can be disposed on a single shaft or a single impeller with multiple impeller portions can be mounted on the shaft.

Rotation of the impeller on the end of the shaft draws molten metal into both impeller chambers, into the upper and lower impeller inlets, along upper and lower interior impeller passages into the upper and lower cavities of the impeller if any, through the upper and lower impeller outlets, and to the respective outlet passages from each impeller chamber. Thus, molten metal can simultaneously flow into the vessel inlet and along the circulation passageway 44. The former flow path causes the vortex flow of molten metal in the charge vessel, while the latter flow path circulates molten metal. The shaft can be moved vertically to achieve flow through one or the other of the inlet passageway 18 or circulation passageway 44, or blended flow through both, as disclosed in the U.S. Pat. No. 7,687,017. The pump may not be connected for fluid communication to the charge vessel at all. Alternatively, the pump may be removably connected for fluid communication to the charge vessel, which facilitates separate cleaning and replacement of pump parts.

The inventive vortexer apparatus may include adapters 52, 54 for avoiding turbulence and inefficiencies resulting from molten metal traveling from the riser or discharge chamber that does not enter the vessel inlet opening or circulation passageway. Upper adapter 52 includes a male end 56 that is received in the vessel inlet passageway and an opposite male end 58 that is received in the riser. The adapter includes a body 60 and exterior shoulder 62 that contacts the vessel around the inlet opening. The male plug end 56 plugs into the vessel inlet passageway 18. A passageway 64 extends along the length of the body. The end 58 can include a conduit 66 received in the opening 50 in the end of the riser and into an opening 68 in the adapter body around the central opening 64. The conduit is cemented to the adapter body. The conduit has an interior passageway 70 of a diameter that approximates the diameter of the passageway 64. One end of the adapter can be cemented to either the riser or the vessel and the other end can be uncemented or unfastened, enabling efficient removal of the pump from the vessel.

The lower adapter 54 includes one end 72 that contacts the base near the discharge passageway and an opposite male end 76 that is received in the circulation passageway 44. The lower adapter includes a body having an exterior shoulder 78 that contacts the vessel around the circulation passageway. A passageway 80 extends along the length of the adapter body. One end of the adapter can be cemented to either the base or the vessel and the other end can be uncemented or unfastened, enabling efficient pump installation or removal for repair or cleaning of the pump.

The inventive vortexer apparatus can be used in various furnace designs. Some furnaces may not have separate pumping and scrap charge chambers. Other furnaces may not have a dross removal chamber. There does not need to be a furnace wall between the pump and charge well for the inventive vortexer apparatus to be used. Both the vessel and the pump can be disposed in a single chamber of molten metal. However, there can be a furnace wall between a scrap charge well or dross well and another chamber (e.g., a pumping chamber), for example, as described in the U.S. Pat. No. 7,497,988. The furnace wall of the well is formed of a suitable refractory material such as refractory brick. An upper inlet passageway and a lower circulation passageway can be formed in the furnace wall. The male plug ends of the upper and lower adapters can be designed to have longer lengths and positioned to extend through the inlet and circulation passageways of the furnace wall. The vessel can be positioned in the well adjacent the furnace wall. The plug ends of the upper and lower adapters 52, 54 are inserted into the inlet passageway 18 and circulation passageway 44 of the vessel 12.

Figure 3:
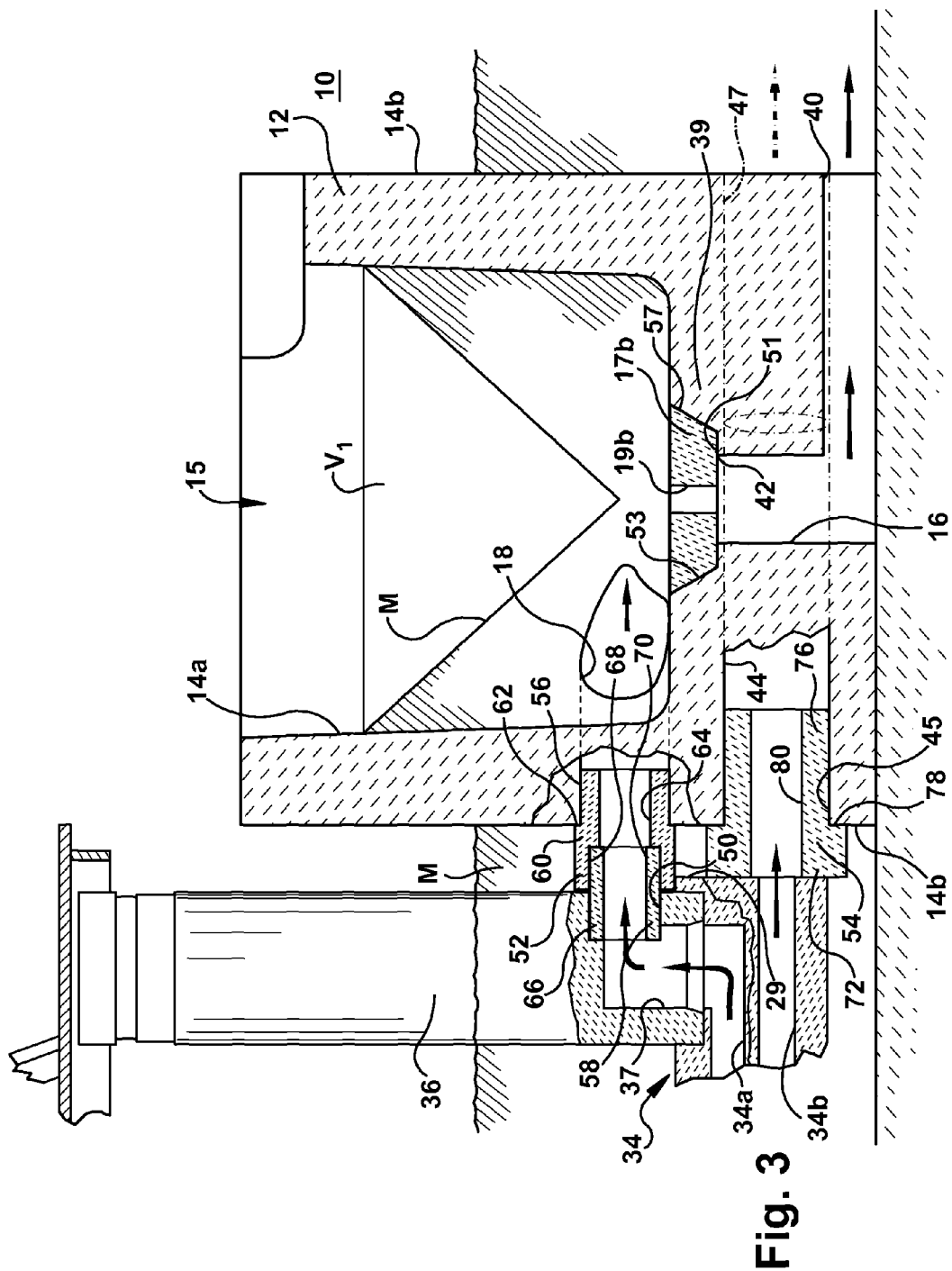
FIG. 3 is a vertical cross-sectional view of the vortexer apparatus of FIG. 1.
Figure 4:
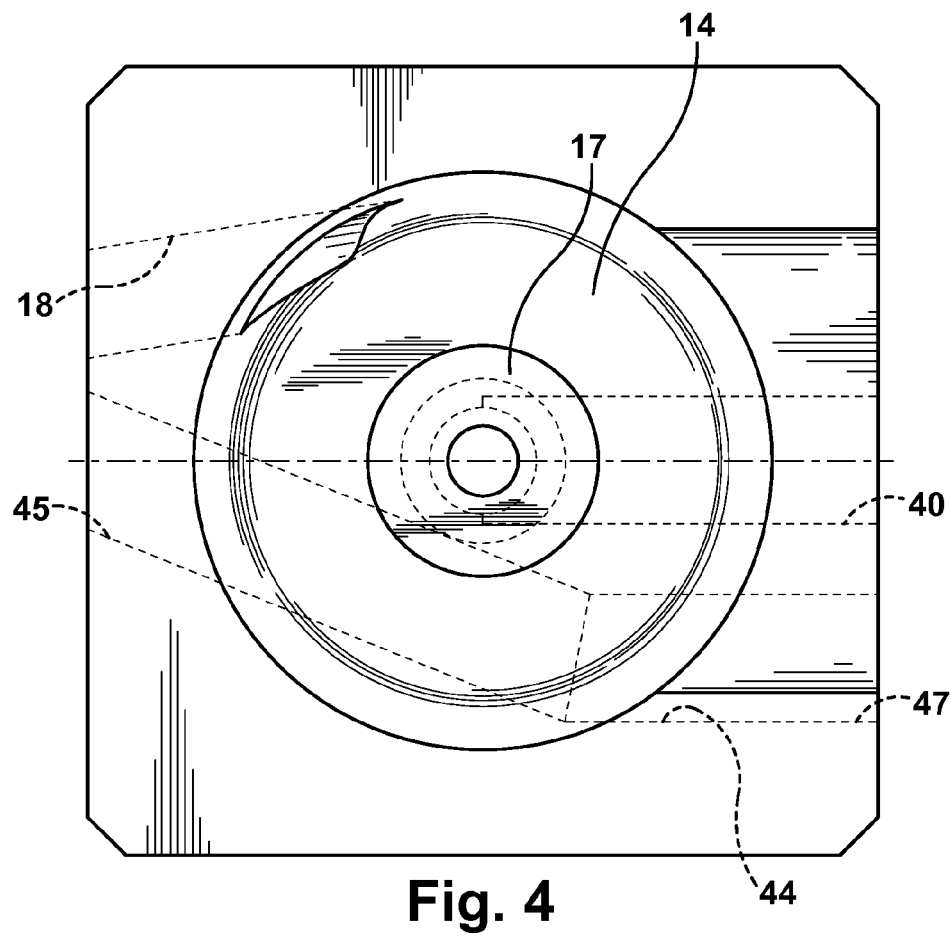
FIG. 4 is a top view of the vortexer vessel.

The vessel can employ a flat bottom surface 51 which intersects with the opening 42 of the vessel outlet passageway 16 (FIG. 3). An inclined side surface 53 can extend upwardly from the bottom surface. The bottom and side surfaces can form a seating surface. The vortex control plates can have a frustoconical shape to approximate the shape of the seating surface. The bottom 55 of the vortex control plates can be flat while the side surface 57 extends at an incline upwardly from the bottom surface. The outlet orifice 19 of the vortex control plate can be centered in alignment with or over the centerpoint of the circular vortex control plate. It will be appreciated that the seating surface and the vortex control plates can have many different shapes. The overall shape of the vortex control plate and its outlet orifice need not be circular but can be any suitable shape.

Figure 6:
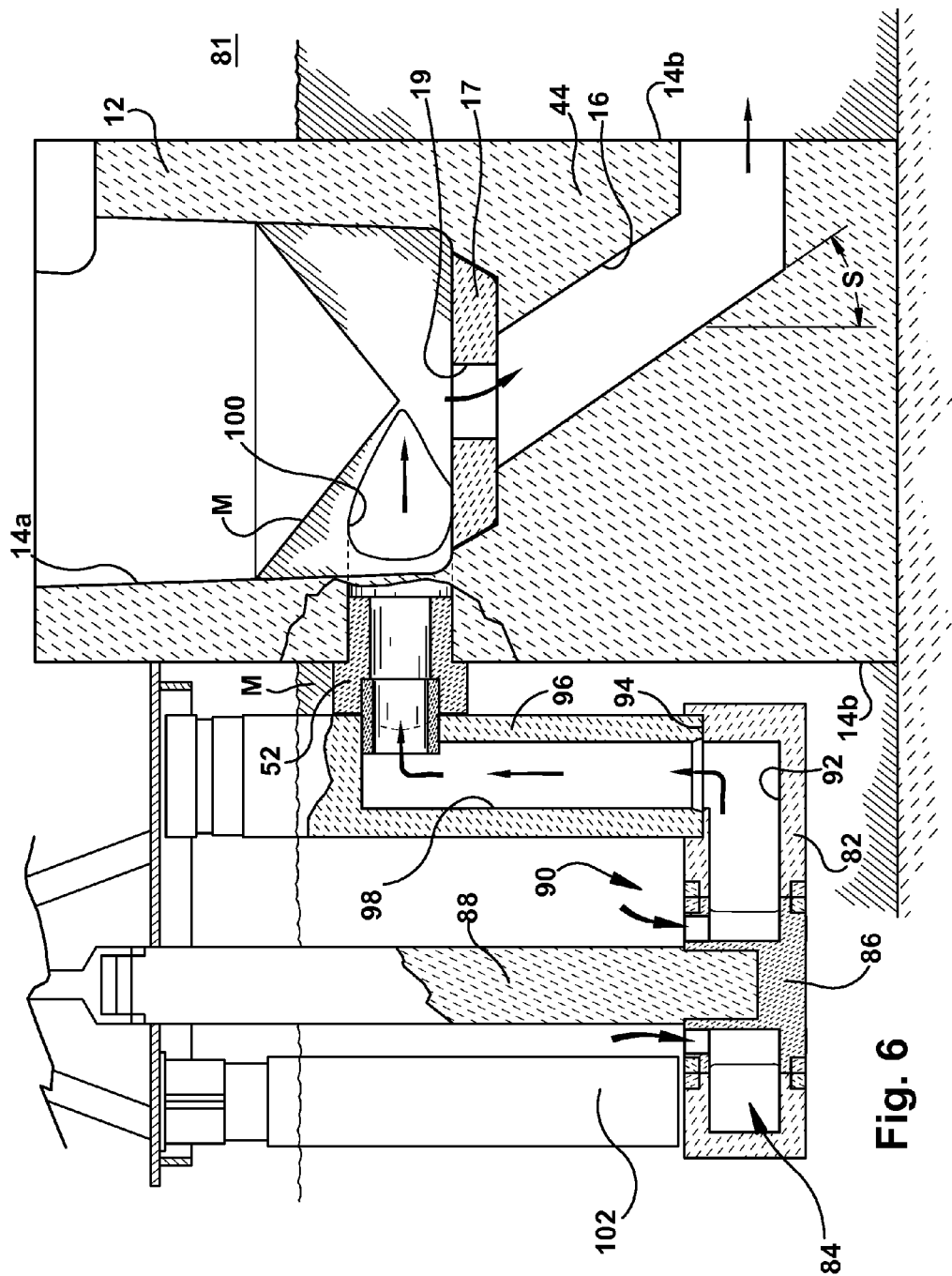
FIG. 6 is a vertical cross-sectional view of another embodiment of the vortexer apparatus described in this disclosure.

In another aspect of the vortexer apparatus 81 including the pump and vessel (FIG. 6), a pump base 82 may include only a single impeller chamber 84 as described in the U.S. Pat. No. 7,497,988. This impeller chamber includes a wall that forms a volute. An impeller 86 is disposed on the end of a shaft in the impeller chamber. The shaft 88 is rotatably driven at an upper end portion by a motor outside the molten metal and the impeller is rotated on the shaft in the impeller chamber. The base includes at least one inlet opening 90 (e.g., an upper inlet opening in this design) and an outlet opening 92. A socket 94 is disposed around the outlet opening. A lower end of a riser 96 is cemented to a shoulder of the socket and an upper end of the riser is fastened to the motor mount outside the molten metal. The riser includes a conduit that forms a molten metal passageway 98 extending from the outlet of the base to near a vessel inlet passageway 100. Support posts 102 and the riser are cemented at their lower ends to the base and removably clamped at their upper ends to the motor mount. Molten metal is drawn through the upper base inlet into the impeller chamber by the rotating impeller. The molten metal travels out of the base through the base outlet passageway, along the conduit of the riser and into the vessel inlet passageway 100. This single impeller chamber pump provides only vortexer flow and not circulatory flow of molten metal. The single impeller chamber pump may include an adapter 52 or not. There may or may not be a furnace wall located between the pump and the vessel. If there is a furnace wall, the adapter 52 extends from the riser, through the wall into engagement with the vessel 12 as described above.

Another aspect of the invention features another embodiment of the vortexer apparatus 104, which modifies the apparatus disclosed in the U.S. Pat. No. 6,217,823, which is incorporated herein by reference. That apparatus includes a pump 106 adjacent a vortexer vessel 108 formed of a block of material. The pump submerges a base 110 in the molten metal 112 in a pump well, for example, and rotates an impeller 114 on the end of the shaft in an impeller chamber 118. A passageway 120 extends from the pump in a side wall of the vessel or through a refractory wall between wells of the furnace. The scrap charging vessel includes a spiraling ramp insert or integrally formed surface 122 located around the periphery of the interior side wall 124 of the vessel starting from near the floor 126 of the vessel and increasing in height. There is an outlet opening 128 in the bottom of the vessel. A seating surface 130 surrounds the outlet opening and receives one of the vortex control plates 17 of the present invention. The vortexer control plate includes an outlet orifice 19 selected as described in this disclosure to adjust the height of the vortex V3 in the vessel as desired.

Molten metal is pumped through the inlet passageway 120 into the scrap charging vessel where it follows the ramp 122 at an upward incline near the side wall of the vessel. Molten metal travels in the vortex V3 in the vessel and then travels downwardly where it passes through the outlet orifice 19 of the vortex control plate. Molten metal then leaves the vessel through outlet passageway 132 and then travels to another location such as to a dross well or to the hearth. By selecting a vortex control plate having a particular size of outlet orifice, the height of the vortex in the vessel can be controlled as desired as described herein.

The adjustable vortexer apparatus includes one or more vortex control plates 17a, 17b having a selected orifice size 19a, 19b. The size of the outlet orifice of the vortex control plate is selected to produce a desired level or height of the vortex V1, V2, V3 in the vessel. This in turn influence the capacity of scrap melting as desired. The vortex control plate described herein is advantageous because it can raise or lower the level of the vortex in the vessel, independent of the rotational speed of the impeller. The invention is so effective that it can even permit a smaller pump to be used while achieving the same vortex height and scrap melting capacity as a larger pump. For example, a large capacity pump may be used with an appropriately sized vessel to achieve a desired scrap melting based on the volume of molten metal in the furnace. Then, it might be desired to use less power in operating the pump. In this case, the first vortex control plate may be replaced with a second vortex control plate having a smaller diameter outlet orifice. This can enable a smaller pump having a smaller pumping capacity to replace the large pump while maintaining or raising the level of the vortex in the vessel even though the vessel has a volume sized so as to be suitable for the large pump and the pump has a smaller pump capacity (lower flow rate into the inlet opening of the vessel) than the previous pump. Thus, the performance of the smaller pump can approximate that of the larger pump while using less energy.

It will be appreciated that the rotational speed of the pump can also be used to adjust the level of the vortex in the vessel. However, the invention advantageously permits control of the vortex level that is independent of the rotational speed of the pump. For example, once an optimum flow rate of circulation is established along the lower circulation passageway, this need not be changed when changing the level of the vortex in the pump. When desired to raise the vortex, one can maintain the same flow rate but replace the vortex control plate with one having a smaller outlet orifice. Conversely, when it is desired to lower the vortex level, the current vortex control plate can be replaced by one having a larger outlet orifice. This lowering of the vortex level is achieved without the need to change the speed of rotation of the pump. Of course, adjustment to the vortex level can further be made by adjusting the speed of the pump so long as desired circulation, if any, is not adversely affected.

The vortex control plates can be supplied as a set of plates having different outlet orifice sizes. One can then observe the vortex level in the pump. This observed level can then be changed by selecting a second vortex control plate having an outlet orifice size selected to provide an adjusted vortex level. On the other hand, a first vortex control plate can be used in scaled down water models and this vortex level can be observed. Then a second vortex control plate can be used having an outlet orifice selected to adjust the level of the vortex in the vessel. Further, computer modeling can estimate or observe a first vortex level using a first vortex control plate. Following this, a second vortex control plate can be used having an outlet orifice selected to achieve a desired second vortex level in the vessel. In other words, the first vortex control plate that provides the reference first vortex level might be obtained in the same pump at hand, a different pump, a water model pump, or a computer modeled pump and then the vortex level can be adjusted with the second vortex control plate of selected outlet orifice in the pump at hand. Thus, the vortex level can be adjusted using one actual vortex control plate (e.g., when the first vortex control plate is part of a computer model or the first vortex level is based on historical observations in other pumps), or can utilize two or more vortex control plates.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of adjusting a vortex of molten metal, comprising: providing a vessel comprising an exterior surface, an interior surface for containing molten metal and a mouth for receiving material at an upper end portion of said interior surface, an outlet passageway extending downwardly from said interior surface and a vortex control plate having an outlet orifice that can be positioned at a bottom of said vessel so that said outlet orifice is in fluid communication with said outlet passageway, and an inlet opening in the vessel located between said exterior surface and said interior surface;

estimating or observing a vortex level;

selecting a size of said outlet orifice of said vortex control plate that can produce a desired level of a vortex in said vessel that is the same as or different than said estimated or observed vortex level;

carrying out said positioning of said vortex control plate of said selected outlet orifice size; and moving the molten metal into said vessel inlet opening and forming said vortex at the desired level in said vessel, wherein said molten metal is moved into said vessel inlet opening by operating a pump, comprising providing at least first and second said vortex control plates, carrying out said operating of said pump while said first said vortex control plate is positioned in said vessel, observing said level of said vortex in said vessel using said first vortex control plate, and selecting said second said vortex control plate to produce the desired level of said vortex that is different than said observed level of said vortex.

2. The method of claim 1 wherein said vessel includes a circulation passageway, comprising moving the molten metal from said pump along said circulation passageway.

3. The method of claim 2 wherein said pump includes an upper impeller member and a lower impeller member rotatable on a lower end of a shaft, and a base that includes upper and lower impeller chambers stacked over one another, wherein said upper impeller member and said lower impeller member are rotatably disposed in said upper impeller chamber and said lower impeller chamber, respectively, a transfer passageway extends from said upper impeller chamber or from said lower impeller chamber and is in communication with said inlet opening of said vessel and a discharge passageway extends from said upper impeller chamber or said lower impeller chamber and is in communication with said circulation passageway, comprising moving molten metal out of said base and into said inlet opening of said vessel and into said circulation passageway.

4. The method of claim 1 wherein said vortex is created by moving the molten metal from said vessel inlet opening up a ramp located near a side wall of the interior surface of said vessel, the molten metal then descending down into the interior of said vessel.

5. A method of adjusting a vortex of molten metal, comprising:

providing a vessel comprising an exterior surface, an interior surface for containing molten metal and a mouth for receiving material at an upper end portion of said interior surface, an outlet passageway extending downwardly from said interior surface and a vortex control plate having an outlet orifice that can be positioned at a bottom of said vessel so that said outlet orifice is in fluid communication with said outlet passageway, and an inlet opening in the vessel located between said exterior surface and said interior surface;

estimating or observing a vortex level;

selecting a size of said outlet orifice of said vortex control plate that can produce a desired level of a vortex in said vessel that is the same as or different than said estimated or observed vortex level;

carrying out said positioning of said vortex control plate of said selected outlet orifice size;

moving the molten metal into said vessel inlet opening and forming said vortex at the desired level in said vessel, and providing a vessel seating surface located at the bottom of said vessel around said outlet passageway, and carrying out said positioning of said vortex control plate in contact with said vessel seating surface.

6. The method of claim 5 wherein said vessel seating surface includes a flat bottom surface leading to said outlet passageway and an inclined side wall extending upwardly from said bottom surface, and said vortex control plate has a frustonical shape and is seated on said vessel seating surface.

7. The method of claim 6 comprising applying no cement between said vessel seating surface and said seated vortex control plate.

8. A method of adjusting a vortex of molten metal, comprising:

providing a vessel comprising an exterior surface, an interior surface for containing molten metal and a mouth for receiving material at an upper end portion of said interior surface, an outlet passageway extending downwardly from said interior surface and a vortex control plate having an outlet orifice that can be positioned at a bottom of said vessel so that said outlet orifice is in fluid communication with said outlet passageway, and an inlet opening in the vessel located between said exterior surface and said interior surface;

estimating or observing a vortex level;

selecting a size of said outlet orifice of said vortex control plate that can produce a desired level of a vortex in said vessel that is the same as or different than said estimated or observed vortex level;

carrying out said positioning of said vortex control plate of said selected outlet orifice size; and moving the molten metal into said vessel inlet opening and forming said vortex at the desired level in said vessel, wherein said molten metal is moved into said vessel inlet opening by operating a pump, comprising providing first and second said vortex control plates, wherein said second vortex control plate has said outlet orifice that is smaller than said outlet orifice of said first vortex control plate, carrying out said positioning of said second vortex control plate and operating said pump such that the following relationships occurs: $V2 \geqq V1$ when $F2 \leqq F1$, where $V2$ and $V1$ are the levels of the vortex in said vessel, and $F2$ and $F1$ are the flow rates through said vessel inlet opening, when said second vortex control plate and said first vortex control plate are used, respectively.

9. The method of claim 8 comprising operating a first large said pump with a large pumping capacity and creating said first said vortex $V1$ in said vessel while using said first vortex control plate and then replacing said large pump with a second said pump having a smaller pumping capacity, operating said second pump and creating said second said vortex $V2$ in said vessel while using said second vortex control plate.

* * * * *